United States Patent [19]
Baker, Jr. et al.

[11] Patent Number: 5,224,148
[45] Date of Patent: Jun. 29, 1993

[54] X-RAY CASSETTE HOLDER AND POSITIONING DEVICE

[75] Inventors: David D. Baker, Jr., Hagerstown, Md.; Louie D. Martin, Waynesboro, Pa.; Mark W. Brown, Myersville, Md.

[73] Assignee: The United States of America as represented by the Secretary of the Army, Washington, D.C.

[21] Appl. No.: 875,617

[22] Filed: Apr. 28, 1992

[51] Int. Cl.⁵ .............................................. G03B 42/02
[52] U.S. Cl. .................................. 378/181; 378/167; 378/182
[58] Field of Search ............... 378/167, 171, 172, 173, 378/174, 175, 181, 182

[56] References Cited

U.S. PATENT DOCUMENTS

| | | | |
|---|---|---|---|
| 4,455,672 | 6/1984 | Hahn et al. | 378/187 |
| 4,538,293 | 8/1985 | Cutter | 378/181 |
| 4,961,213 | 10/1990 | Linhart | 378/181 |
| 5,148,466 | 9/1992 | Fajae | 378/181 |

Primary Examiner—David P. Porta
Attorney, Agent, or Firm—John F. Moran; Werten F. W. Bellamy; Anthony T. Lane

[57] ABSTRACT

A cassette holder and positioning assembly device for a portable x-ray machine, comprising: a mounting plate; oppositely adjustable vertical arms disposed in parallel relationship on the mounting plate attached in proximity to an outer periphery along vertical axes of the plate and opposite horizontal arms mounted fixedly on the plate and disposed in perpendicular relationship to the vertical arms; a selection handle disposed pivotally between alignment guides on a handle gear that meshes with a circumferential gear pivotally attached to linkage arms in perpendicular relationship to portions of the mounting plate beneath the alignment guides and pivotally attached to a backstop linkage arm in perpendicular relationship to the alignment guides, the backstop linkage arm is pivotally attached to a platform fixed to the mounting plate; a semi-circular indexing plate containing a plurality of notches in its inner arc and fixed in raised relation on the mounting plate above the selection handle; the selection handle having a spring-tensioned tongue member extending from a housing fixed between the handle gear and the semi-circular indexing plate, the tongue member being releasable from a given notch and available for another notch through a push button disposed in the selection handle; one of the alignment guides contains an ejection block slidably disposed in a guide rail in the alignment guide.

6 Claims, 6 Drawing Sheets

X-RAY CASSETTE HOLDER AND POSITIONING DEVICE

GOVERNMENT INTEREST

The invention described herein may be manufactured, used and licensed by or for the Government for governmental purposes without the payment to us of any royalties thereon.

FIELD OF THE INVENTION

The present invention relates to an x-ray holder and positioning device without multiple adjustments or spacer blocks, and permits high volume radiography in a military field environment with portable x-ray machines of varying sizes and weights, and when combined with fixed geometry portable x-ray systems, the device reduces retake rates due to improper positioning or alignment by providing position accuracy comparable to permanently mounted hospital based systems.

BACKGROUND OF THE INVENTION

In the x-ray cassette holder field, it is a desirable objective to provide a user-friendly x-ray cassette holder and positioning device wherein the positioning device is characterized by: as few adjustments as possible; wherein the x-ray cassette holder and positioning device allows a high volume of radiography in a variety of environmental situations; and wherein the design of such a user-friendly x-ray cassette holder and positioning device is capable of being used with portable x-ray machines having different sizes, weights and configurations.

U.S. Pat. No. 4,455,672 discloses a cassette holder assembly for an x-ray examination apparatus comprising a housing, cassette holder means associated with the housing and having oppositely adjustable clamping jaw means for the centric clamping of x-ray film cassettes of varying format, spring means for drawing the clamping jaw means toward one another, an actuating handle displaceable on the housing of the cassette holder means, an actuating frame movably mounted by the housing and coupled with the handle for movement in a given direction when manual force is applied to the handle for the purpose of moving the clamping jaw means toward a release condition; the clamping jaw means comprising a first clamping jaw connected with the actuating frame for movement toward a release condition as the actuating frame is moved in the given direction, and lever means comprising a lever pivotally mounted on the housing intermediate the ends of the lever and having a first end coupled with the actuating frame and a second end for moving oppositely to the actuating frame, the clamping jaw means comprising a second clamping jaw disposed opposite the first clamping jaw and coupled with the second end of the lever so as to move oppositely to the first clamping jaw as the actuating frame is moved in said given direction; the handle thereby being manually actuatable to move the first and second clamping jaws away from each other against the action of the spring means.

An x-ray film cassette holder is depicted in U.S. Pat. No. 4,538,293, wherein the x-ray film cassette holder includes a clamping mechanism for positioning a film cassette therein as the holder is inserted into an associated x-ray machine, and two linear potentiometers for sensing the dimensions of the film cassette. The clamping mechanism has two positioning assemblies which act to position the film cassette in two orthogonal directions and an actuator assembly that links the positioning operation to the insertion movement, all mounted on a tray that is adapted for insertion into the x-ray machine.

An x-ray apparatus comprising a film cassette which is displaceable in a carriage is disclosed in U.S. Pat. No. 4,961,213. The x-ray apparatus comprises, in combination: a support; a carriage for a film cassette displaceable in a load direction; a cassette clamp device for positioning the cassette perpendicularly to the load direction; a plurality of pairs of guide rollers offset with respect to one another in the load direction on the support and on the carriage; independently controlled motor drives which act on the clamp device via an endless loop traction means set forth guided via the rollers, the traction means sections between the rollers on the carriage being parallel to one another and between the rollers on the support being parallel to one another; and the endless loop traction means forming a closed loop which is movable relative to the support throughout the loop guided from one roller of a roller pair mounted on the support to the other roller of the pair via one of the pairs of rollers on the carriage, the loop being coupled to the clamp device for fixing the cassette position, two motor drives acting on the traction means via the rollers on the support, between said rollers on said support there being situated at least one roller which is not secured to the support.

However, in the foregoing x-ray film cassette holder apparatus of the prior art, there is an absence of any apparatus which utilizes a one-lever/handle element to provide positioning and size adjustment for five x-ray cassette sizes in both vertical and horizontal directions.

SUMMARY OF THE INVENTION

It is an object of the invention to provide an x-ray cassette holder and positioning device which utilizes one lever-handle to position at least five x-ray cassette sizes in both vertical and horizontal directions.

A further object of the invention is to provide an x-ray cassette holder and positioning device having one lever/handle for positioning at least five x-ray cassette sizes in both vertical and horizontal directions that is of a minimal thickness to allow use of the x-ray cassette holder and positioning device with portable x-ray machines.

A yet further object of the invention is to provide an x-ray cassette holder and positioning device comprising one lever/handle which permits positioning of at least five x-ray cassette sizes in both vertical and horizontal directions, and yet provides positive beam lock and cassette size interlocking capability with portable x-ray machines.

A still further object of the invention is to provide an x-ray cassette holder and positioning device comprising one lever/handle for positioning at least five x-ray cassette sizes in both vertical and horizontal directions, that is adaptable to either manual or automatic x-ray beam collimators; wherein the device provides an integral x-ray cassette ejection mechanism, and includes rigid indexing and locking in all five positions.

These and other objects of the invention will become apparent from the description of the drawings and detailed description of the invention hereinafter set forth.

DETAILED DESCRIPTION OF THE PREFERRED EMBODIMENTS

Figure 1:
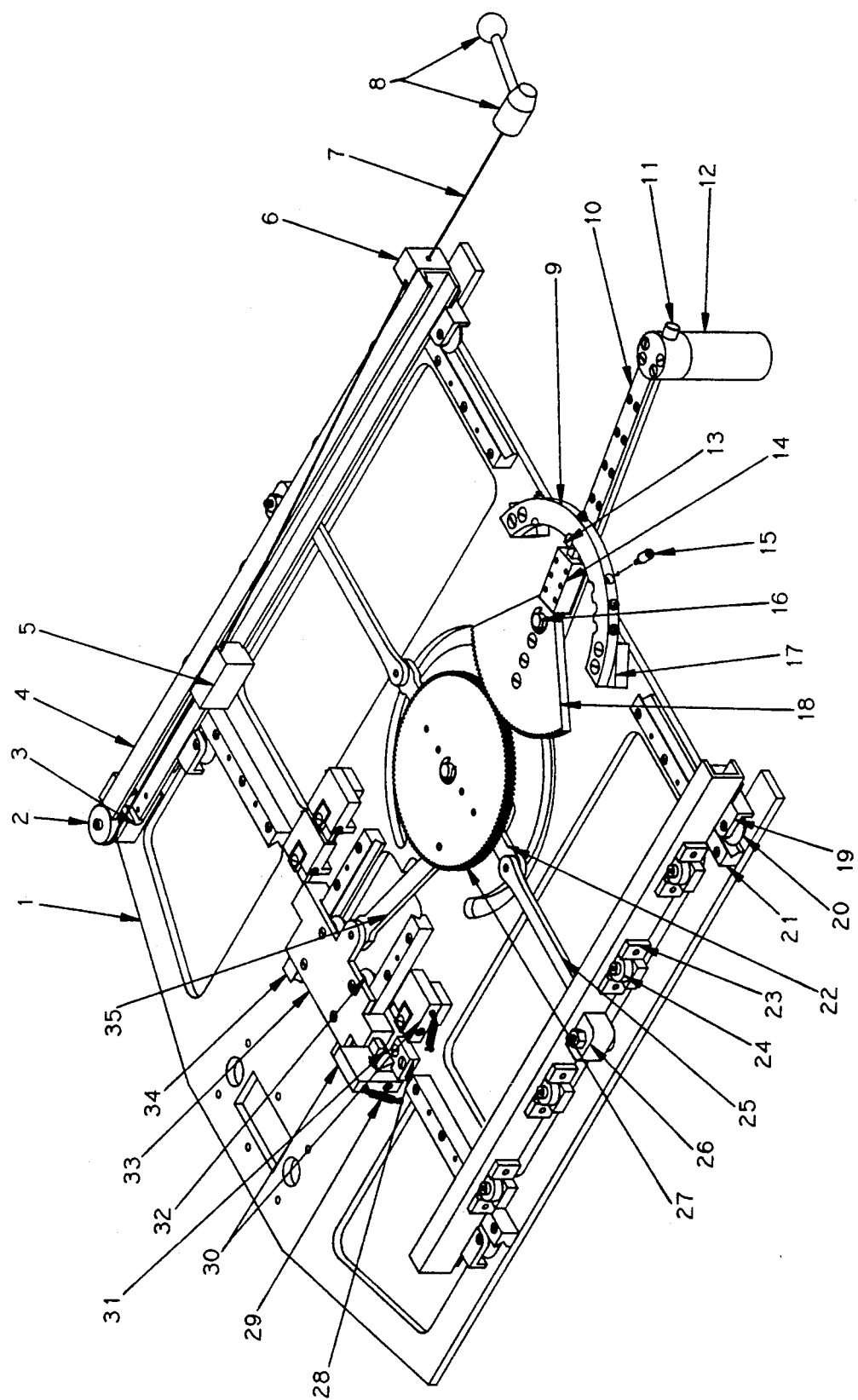
FIG. 1 is a view in perspective of the x-ray cassette holder and position adjusting mechanism of the invention.

FIG. 1 illustrates a cassette holder and positioning assembly device for providing accurate positioning to the central axis of an x-ray beam of a portable x-ray machine of fixed geometry, in order to accommodate various x-ray cassette sizes. In this figure, there is shown a mounting plate P and a selection handle 10 connected to a hand grip 12. While the selection lever may be moved to accommodate different x-ray cassette sizes, it is a preferred embodiment of the invention to move the single lever to one of five positions for selection of x-ray cassette sizes; namely, x-ray cassette sizes including 8"×10", 10"×12", 11"×14", 14"×17" and 17"×14".

In general, the cassette holder and positioning assembly device comprises: a mounting plate; oppositely adjustable vertical arm alignment guides 4 disposed in parallel relationship on said mounting plate for an x-ray cassette attached in proximity to an outer periphery along vertical axes of the plate and opposite horizontal arms HA mounted fixedly on said plate and disposed in perpendicular relationship to the vertical arms.

The selection handle is disposed pivotally between the vertical arm alignment guides on a handle gear 18, having a 6-inch pitch diameter, and the handle gear meshes with a circumferential gear 27 (having a 5-inch pitch diameter) and the circumferential gear is pivotally attached to linkage arms 25 in perpendicular relationship to portions of the mounting plate beneath the vertical alignment guides and pivotally attached to a backstop linkage arm 35 which is substantially in perpendicular relationship to the vertical alignment guides or a straight-line alignment with the selection handle when the selection handle is in perpendicular relationship to the alignment guides. The backstop linkage arm is also pivotally attached to a platform 33 which is a triggering pin and guide wheel mounting platform fixed to the mounting plate.

A rigid indexing and locking assembly comprising a semi-circular indexing plate 9 containing a plurality of notches in its inner arc and fixed in raised relation on the mounting plate above the selection handle maintains position and provides feedback via push-button switches for positive beam lock (i.e. collimator size selection must match cassette size selection to prevent disablement of the system). The selection handle has a spring-tensioned tongue or position indexing member 13 extending from a spring and plunger housing 14 fixed between the handle gear and the semi-circular indexing plate, so that the tongue or plunger may be releasable from a given notch in the indexing plate and made available for another notch by pressing a push button or position lock release 11 disposed in the selection handle while moving the handle through an arc to accommodate a given x-ray cassette size.

One of the vertical arm parallel alignment guides contains a cassette ejection block 5 slidably disposed in a guide rail in the alignment guide to facilitate ejection of all cassette sizes.

The ejection mechanism consisting of the cassette ejection block glides along one of the guide channels via ball bearings that ride in groove inside of the channel. The ejection block is spring loaded to the rear position to a spring mounting bracket 3 containing a constant force spring 2 for retraction of the ejection block. The ejection block has a cable 7 which is attached to an ejection handle 8; said cable also extending through the ejection block and directly back to the spring mounting bracket as a continuous cable.

It will be noted that the vertical arm alignment guides have a plurality of guide wheels 20 pivotally mounted at ends of the undersides thereof for movement in tracks disposed in the outside perimeter of the horizontal arms.

In operation, the selection lever attached to the partial gear of 6-inch pitch is moved from one position to the next, and as the selection lever is moved from one position to the next, the partial gear drives the central or circumferential gear of 5-inch pitch diameter which is attached to the set of mechanical linkage arms.

The linkage arms for vertical adjustment either push or pull the x-ray cassette guide channels along a set of linear bearings to the correct position. The linkage arm 35 for the horizontal or rare adjustment either pushes or pulls along a linear bearing, a small platform 33 which is a triggering pin and guide wheel mounting platform to which a set of triggering pins 31 are attached. The triggering pins actuate four individual backstops 30 by flipping them to either an up or down position. A spring 29 which is an overcenter mounted spring attached to the backstop or flipper completes and maintains the rotation of the flipper to the up or down position.

It will be noted that a set of idler rollers 24 are rotatably mounted along both vertical x-ray cassette guide channels in order to make insertion and removal of the x-ray cassettes easier by preventing sliding friction of the cassette inside the guide channel.

As earlier alluded to, the cassette ejection mechanism consists of a small block that guides along one of the guide channels via ball bearings that ride in a groove inside of the channel, wherein the ejection block is spring loaded to the rear position and serves as a fifth backstop when in this position. A small handle attached via a steel cable to the ejection block is pulled upon to facilitate easy ejection of any cassette size. The ejection mechanism is necessary because the entire assembly is enclosed by a housing (not shown) containing only a slot for x-ray cassette insertion and removal.

The reference numerals corresponding to the nomenclature for various parts of the x-ray cassette holder and positioning device are set forth hereunder as follows:

| | |
|---|---|
| P | Component Mounting Plate |
| 2 | Constant Force Spring for Retraction of Eject Block |
| 3 | Spring Mounting Bracket |
| 4 | X-ray Cassette Vertical Alignment Guide (1 of 2) |
| 5 | Cassette Ejection lock |
| 6 | Cassette Ejection Cable Guide |
| 7 | Cassette Ejection Cable |

-continued

| | |
|---|---|
| 8 | Cassette Ejection Pull Handle |
| 9 | Position (Cassette Size) Indexing Plate |
| 10 | Position (Cassette Size) Selection Handle |
| 11 | Push Button for Position Lock Release |
| 12 | Hand Grip for Selection handle |
| 13 | Position Indexing Plunger |
| 14 | Spring and Plunger Housing |
| 15 | Microswitch for Cassette Size Feedback (1 of 5) |
| 16 | Gear Mounting Shaft (1 of 2) |
| 17 | Index Plate Mounting Block |
| 18 | Handle Gear (6 inch pitch Diameter) |
| 19 | Mounting Bracket for Guide Wheels on linear bearings (1 f 4) |
| 20 | Guide Wheel for Linear Bearings (1 of 8) |
| 21 | Guide Rail for Linear Bearings (1 of 4) |
| 22 | Center Linkage Arm |
| 23 | Mounting Bracket for Idler Roller (1 of 8) |
| 24 | Idler Roller for Easy Cassette Insertion and Ejection (1 of 8) |
| 25 | Outside Linkage Arm (1 of 2) |
| 26 | Pivot Bearing Housing for Outside Linkage (1 of 2) |
| 27 | Center Gear (5 inch pitch Diameter) |
| 28 | Backstop Flipper Mounting Base (1 of 4) |
| 29 | Backstop Flipper Over-center Mounted Spring |
| 30 | Backstop Flipper (4 total) |
| 31 | Flipper triggering pin (1 of 2) |
| 32 | Guide Wheel for Backstop Linear Bearing (1 of 4) |
| 33 | Triggering Pin and Guide Wheel Mounting Platform |
| 34 | Guide Rail for Backstop Linear Bearing (1 of 2) |
| 35 | Backstop Linkage Arm |

Figure 2:
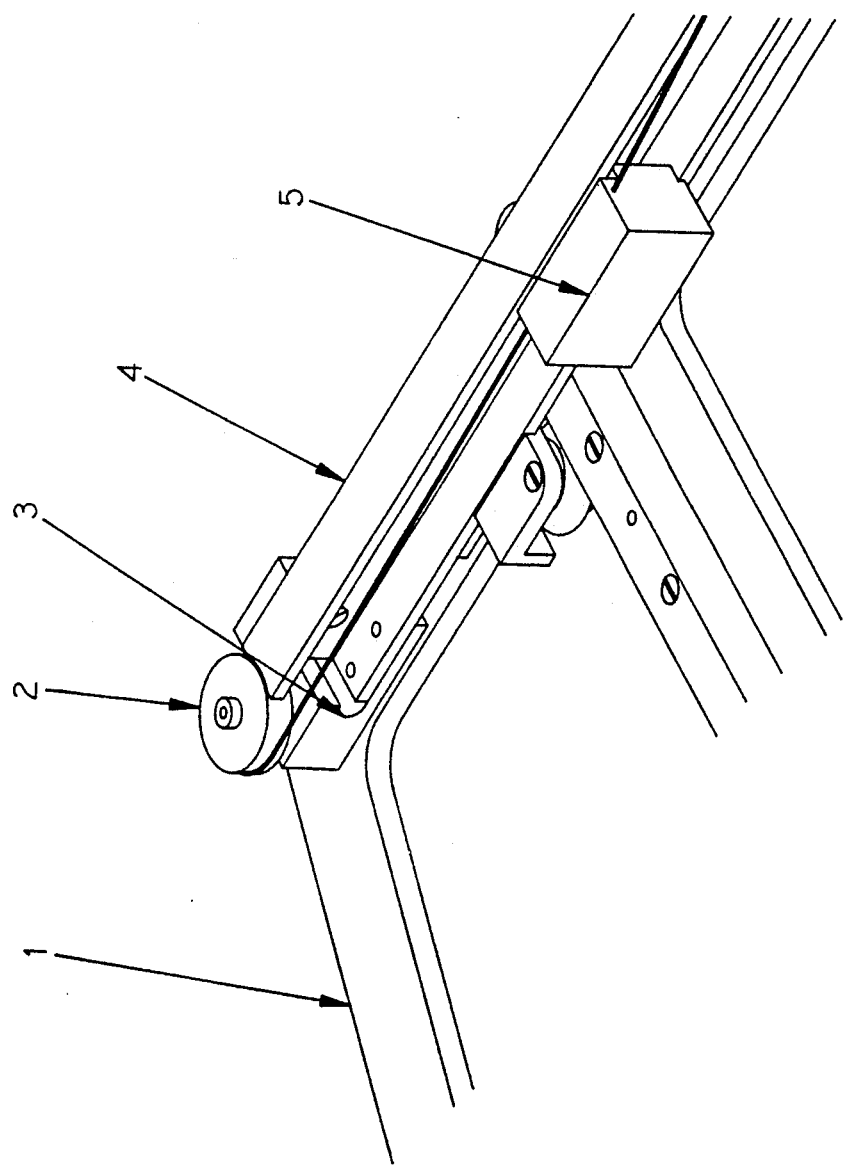
FIG. 2 is an enlarged partial view showing the cassette ejection block area of FIG. 1.

In FIG. 2, there is shown an enlarged partial view of the x-ray cassette holder showing the spring mounting bracket 3 on which the constant force spring 2 for retraction of the ejection block is disposed. As already mentioned, the ejection block is spring loaded in the rear position and functions as a fifth backstop in this position.

Figure 3:
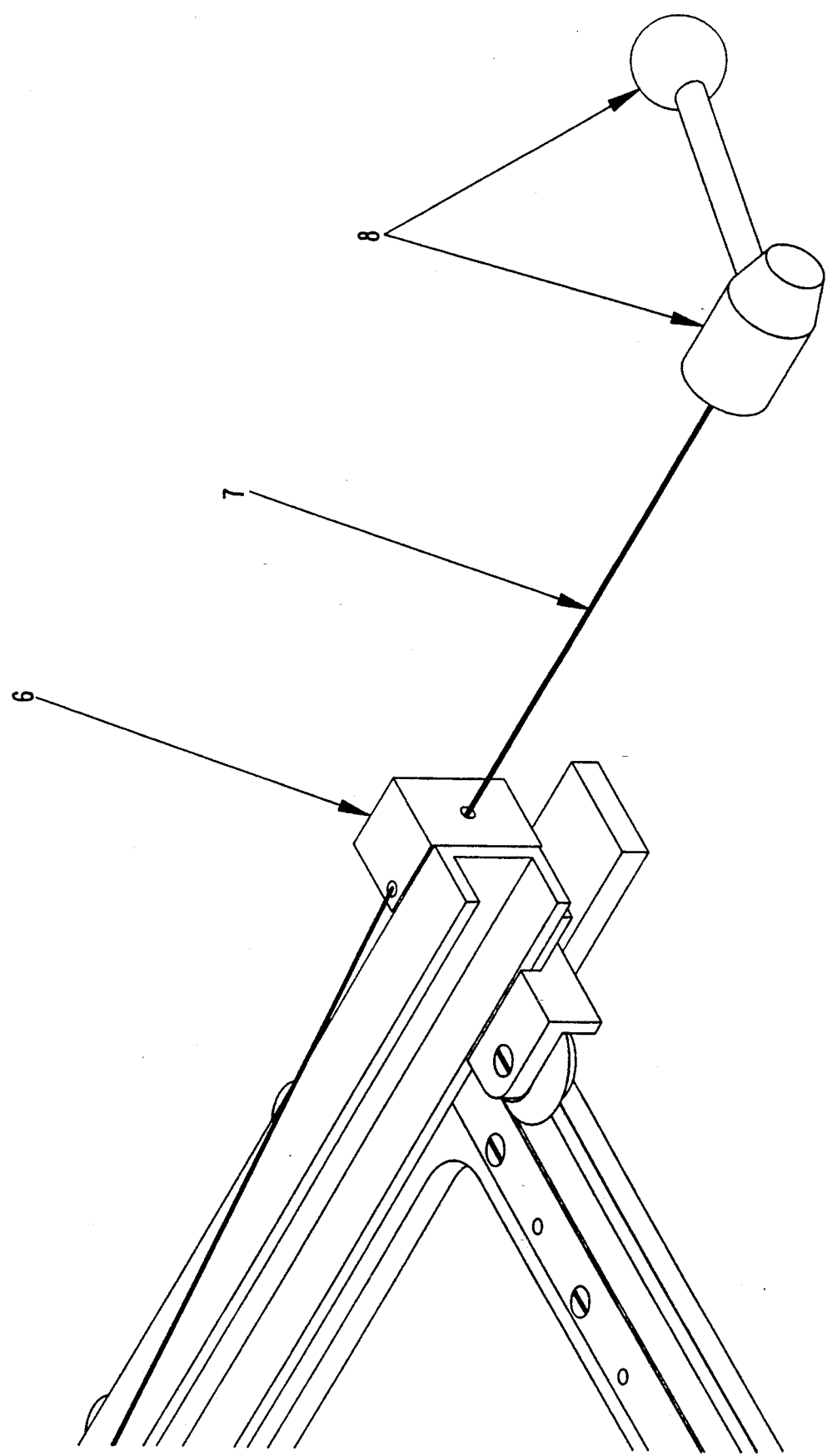
FIG. 3 is an enlarged partial view showing the cassette ejection handle and cable area of FIG. 1.

The enlarged partial view in FIG. 3 affords a look at the cassette ejection handle and cable area, wherein the handle 8 is attached via a steel cable 7 to the ejection block. As can be seen from FIG. 3, a cassette ejection cable guide 6 is mounted on an end exterior portion of the vertical alignment guide 4 and contains an entry and an exit opening through which the cable is threaded.

Figure 4:
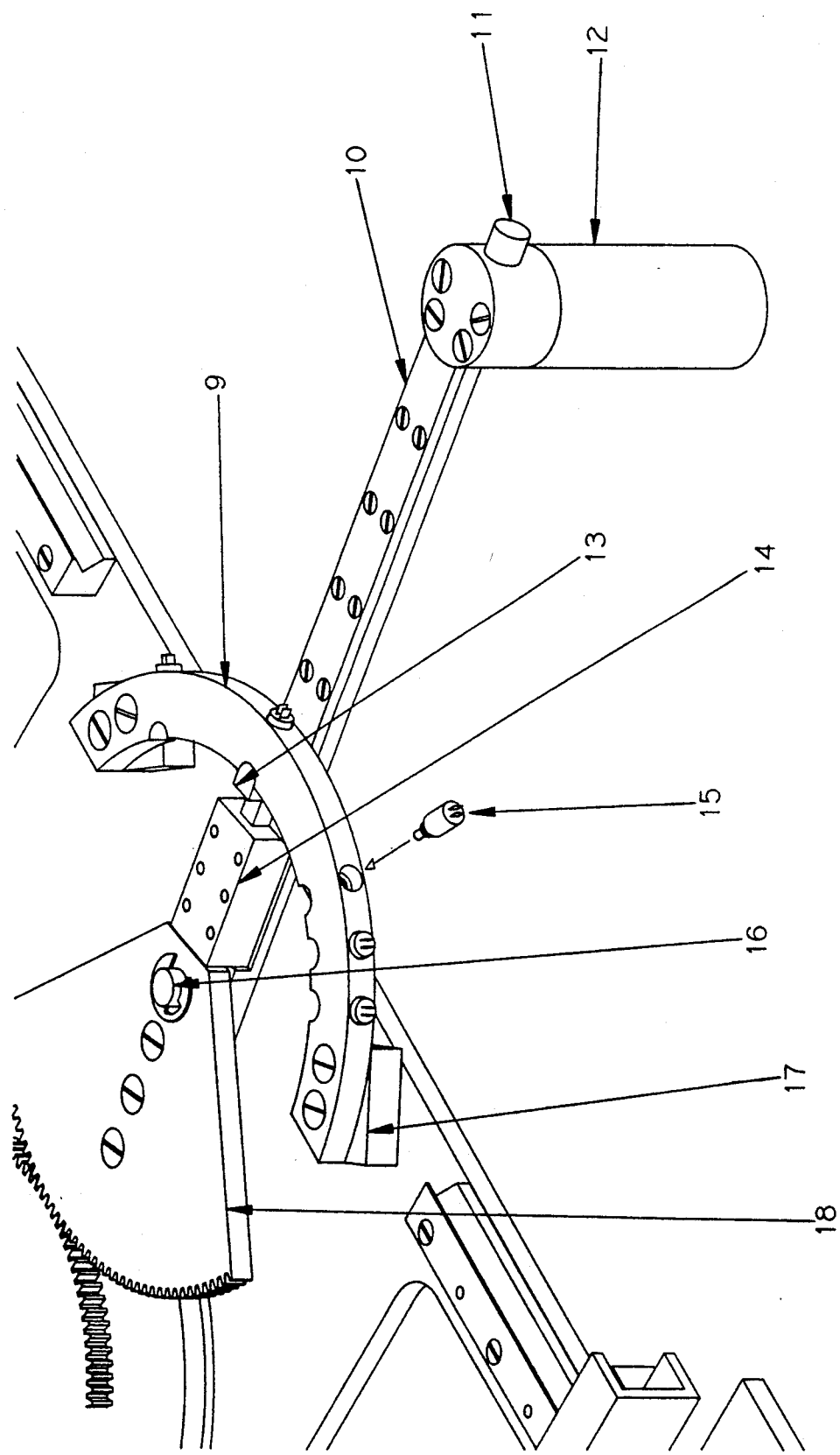
FIG. 4 is an enlarged partial view showing the indexing, locking, and position sensing mechanism of the x-ray cassette holder and positioning device of FIG. 1.

An enlarged partial view showing the indexing, locking, and position sensing mechanism of the x-ray cassette holder and positioning device is shown in FIG. 4. From this figure, it may be seen that a plurality of openings is disposed in the indexing plate to accommodate microswitches for cassette size feedback; in particular, in the preferred embodiment of this invention, there are five holes in the index plate, which is mounted on an index plate mounting block 17. The microswitches for cassette size feedback via push-button switches (not shown) for positive beam lock or collimator size selection is utilized in order to prevent the system from being disabled. The position selection handle 10 for cassette size adjusts for positioning in both vertical and horizontal directions, and in the context of this invention, the overall thickness of adjustment mechanism is one-half inch and this makes the device idea for portable radiography equipment. Further, it is easily adaptable to x-ray systems of many different configurations and provides positive beam lock and cassette size interlocking. The device of the invention is completely self-contained and requires no associated spacer blocks or shims. The device of the invention is compact and light-weight and can be used with conventional x-ray cassettes, polaroid film or stimulable phosphor plates, and it will accept, center and hold x-ray film cassettes of may different sizes, but is specifically and preferably utilized to hold 8"×10", 10"×12", 11"×14", 14"×17" and 17"×14".

Figure 5:
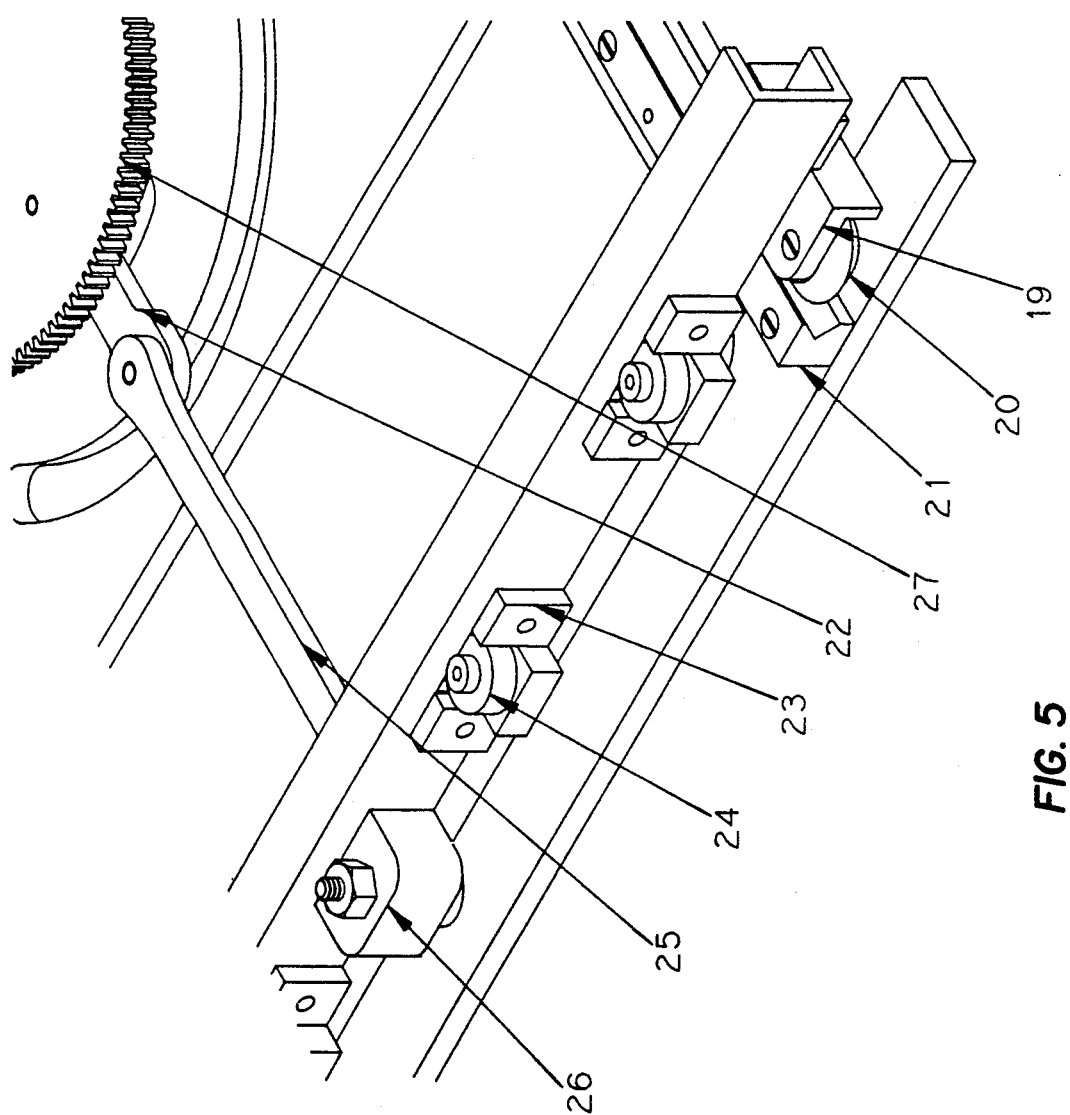
FIG. 5 is an enlarged partial view showing the linear bearing, idler roller and linkage arm of FIG. 1.

The enlarged partial view of FIG. 5 provides a more detailed view of outside linkage arm 25 of the x-ray cassette holder. In this view, there is shown a pivot bearing housing 26 for the outside linkage, idler rollers 24 for easy cassette insertion and ejection, and pairs of mounting brackets 23 for the idler roller. A guide rail 21 for a guide wheel 20 for the linear bearings may also be seen in more detail from FIG. 5.

Figure 6:
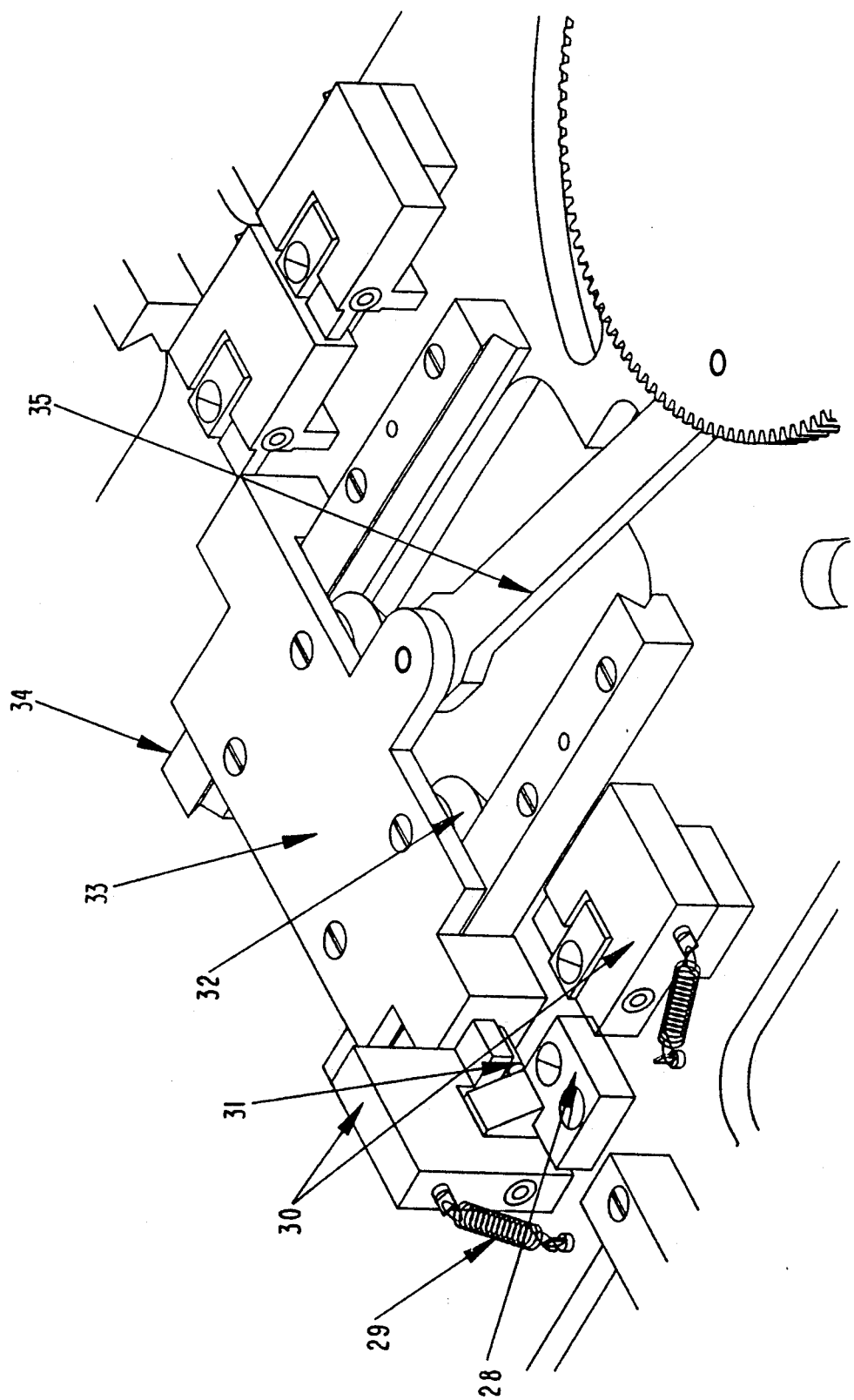
FIG. 6 is an enlarged partial view showing the cassette backstop mechanism of FIG. 1.

In FIG. 6, the backstop linkage arm 35 for the horizontal or rear adjustment that pushes or pulls along a linear bearing may be seen. In this view there is shown a triggering pin and guide wheel mounting platform 33 to which a set of triggering pins 31 is attached. The triggering pins actuate four individual backstops by flipping them to either an up or down position, and a spring 29 which is an overcenter mounted spring for the backstop flipper 30 completes and maintains the rotation of the flipper to the up or down position. Element 28 shows the backstop flipper mounting base and element 34 is the guide rail for the backstop linear bearing.

The x-ray cassette holder and positioning device of the invention is contemplated for use with fixed geometry portable and fixed x-ray systems, and may be utilized to position x-ray films for industry radiography applications and emergency room x-ray machines.

The unique features of the invention include the capability of positioning and size adjustment with one lever/handle for many different x-ray cassette sizes, but the invention is preferably utilized in connection with five x-ray cassette sizes. Because the invention is compact, contains a light-weight design and is of minimal thickness, it is especially adaptable to use with portable x-ray machines. It also provides positive beam lock, and cassette size interlocking capability to portable machines and is adaptable to either manual or automatic x-ray beam collimators. Finally, the x-ray cassette holder and positioning guide device of the invention also includes an integral x-ray cassette ejection mechanism as well as a rigid indexing and locking mechanism for all positions needed to accommodate different x-ray cassette sizes.

The x-ray cassette holder and positioning device of the invention is user-friendly and there is no need to utilize multiple adjustments or spacer blocks when operating or adjusting the device. The device of the invention permits high-volume radiography in a military field environment; is ideal for use with portable x-ray machines due to size, weight and adaptable configuration, and when combined with fixed geometry portable x-ray systems, it can be reduce retakes rates due to improper positioning or alignment by providing the position accuracy similar to permanently mounted hospital-based systems.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A cassette holder and positioning assembly device for providing accurate positioning to the central axis of an x-ray beam of a portable x-ray machine of fixed geometry to accommodate different x-ray cassette sizes, comprising:

a mounting plate;

oppositely adjustable vertical arms disposed in parallel relationship on said mounting plate as alignment guides for an x-ray cassette attached in proximity to an outer periphery along vertical axes of said plate and opposite horizontal arms mounted fixedly on said plate and disposed in perpendicular relationship to said vertical arms;

a selection handle disposed pivotally between said alignment guides on a handle gear that meshes with a circumferential gear pivotally attached to linkage arms in perpendicular relationship to portions of said mounting plate beneath said alignment guides and pivotally attached to a backstop linkage arm substantially in perpendicular relationship to said alignment guides, said backstop linkage arm being pivotally attached to a platform fixed to said mounting plate;

a semi-circular indexing plate containing a plurality of notches in its inner arc and fixed in raised relation on said mounting plate above said selection handle;

said selection handle having a spring-tensioned tongue member extending from a housing fixed between said handle gear and said semi-circular indexing plate, said tongue member being releasable from a given notch and available for another notch by pressing a push button disposed in said selection handle while moving said handle through an arc to accommodate a given x-ray cassette size;

wherein one of said alignment guides contains an ejection block slidably disposed in a guide rail in the alignment guide;

said ejection block having a cable running therethrough which is connected to a handle at one end and connected to a tension-spring at another end;

said vertical arm alignment guides having a plurality of guide wheels pivotally mounted at ends of the undersides thereof for movement in tracks disposed in the horizontal arms.

2. The cassette holder and positioning assembly device of claim 1, wherein the oppositely adjustable vertical arms contains a plurality of pivotally mounted idler rollers to facilitate cassette insertion and ejection.

3. The cassette holder and positioning assembly device of claim 2, wherein said oppositely adjustable horizontal arms contain pivot bearing housing for said linkage arms disposed in perpendicular relationship to said vertical arms.

4. The cassette holder and positioning assembly device of claim 3, wherein said semicircular indexing plate contains microswitch means for cassette size feedback.

5. The cassette holder and positioning assembly device of claim 4, wherein the horizontal arm to which said backstop linkage arm is pivotally attached contains a backstop mounting base having a pair of spring-tensioned flippers attached thereto to permit a triggering pin from a guide wheel mounting platform to be movably fixed in place to accommodate a given cassette size.

6. The cassette holder and positioning assembly device of claim 5, containing a guide rail for a linear bearing of said backstop linkage arm.

* * * * *